US012657562B2

(12) United States Patent
Miyashita

(10) Patent No.: US 12,657,562 B2
(45) Date of Patent: Jun. 16, 2026

(54) STORE SERVER, METHOD, AND STORAGE MEDIUM

(71) Applicant: Toshiba Tec Kabushiki Kaisha, Tokyo (JP)

(72) Inventor: Shuta Miyashita, Mishima (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 51 days.

(21) Appl. No.: 18/757,421

(22) Filed: Jun. 27, 2024

(65) Prior Publication Data

US 2025/0124417 A1 Apr. 17, 2025

(30) Foreign Application Priority Data

Oct. 13, 2023 (JP) ................................. 2023-177402

(51) Int. Cl.
*G06Q 20/20* (2012.01)
(52) U.S. Cl.
CPC .................................. *G06Q 20/202* (2013.01)
(58) Field of Classification Search
CPC .. G06Q 20/202; G06Q 20/20; H04L 67/1008; H04L 67/1001; H04L 67/59; H04L 43/0876; G07G 1/14; G07G 1/0009
USPC .......................................................... 705/21
See application file for complete search history.

(56) References Cited

U.S. PATENT DOCUMENTS 10,395,225 B2 8/2019 Lee
11,341,474 B2 5/2022 Mangtani et al.

2004/0172276 A1 9/2004 Kamo
2016/0379196 A1* 12/2016 Kawamori ........... G06Q 20/202
705/21
2019/0182317 A1* 6/2019 Tao ..................... H04L 67/1029
2021/0182995 A1 6/2021 Cella et al.
2021/0357838 A1 11/2021 Cella et al.
2023/0057832 A1 2/2023 Tang
(Continued)

FOREIGN PATENT DOCUMENTS

JP 2004-265055 A 9/2004

OTHER PUBLICATIONS

Haghgoo, Maliheh et al. A Cloud-Based Platform for Service Restoration in Active Distribution Grids. IEEE Transactions on Industry Applications, 2022. (Year: 2022).*
(Continued)

*Primary Examiner* — Fawaad Haider
(74) *Attorney, Agent, or Firm* — Kim & Stewart LLP

(57) ABSTRACT

A store server for managing POS terminals used in a store, includes an interface connectable to the terminals and a cloud server configured to manage transaction information about a sales transaction performed by the terminals and a processor configured to: determine a communication load of the cloud server, determine whether the transaction information is to be transmitted to the cloud server based on the load, when the transaction information is to be transmitted, control the interface to output to the terminals an instruction to set a destination of the transaction information to the cloud server, and when the transaction information is not to be transmitted, control the interface to output to the terminals an instruction to set the destination to the store server, and upon receipt of the transaction information from the terminals, store the transaction information.

15 Claims, 6 Drawing Sheets

(56) References Cited

U.S. PATENT DOCUMENTS

| | | | |
|---|---|---|---|
| 2023/0102134 A1* | 3/2023 | Hervey | ................ G06Q 20/22 |
| | | | 705/21 |
| 2023/0249310 A1 | 8/2023 | Müller | |

OTHER PUBLICATIONS

Extended European Search Report mailed Jan. 30, 2025, in corresponding European Patent Application No. 24192980.1, 10 pages.

\* cited by examiner

FIG. 6

STORE SERVER, METHOD, AND STORAGE MEDIUM

CROSS-REFERENCE TO RELATED APPLICATION

This application is based upon and claims the benefit of priority from Japanese Patent Application No. 2023-177402, filed Oct. 13, 2023, the entire contents of which are incorporated herein by reference.

FIELD

Embodiments described herein relate generally to a store server, a method, and a storage medium.

BACKGROUND

Conventionally, a cloud server for centrally managing information for all stores in a group is provided in addition to an in-store system including sales data processing apparatuses and a store server. Also, in a system that has been put into practical use in recent years, in-store sales data processing apparatuses directly refer to information stored in a cloud server and directly store transaction information in the cloud server.

However, since the cloud server transmits and receives information to and from many apparatuses, the communication traffic and the communication load may increase when, for example, stores are busy. In this case, the quality of communication between the cloud server and the in-store apparatuses may become poor.

SUMMARY OF THE INVENTION

An embodiment of the present disclosure provides an information processing apparatus that makes it possible to use in-store apparatuses without any problem even when the communication load of a cloud server is high.

In one embodiment, a store server for managing point-of-sale (POS) terminals used in a store, comprises a communication interface connectable to the POS terminals and a cloud server configured to manage transaction information about a sales transaction performed by the POS terminals; a storage device; and a processor configured to: determine a communication load of the cloud server, determine whether the transaction information is to be transmitted to the cloud server based on the communication load, when the transaction information is to be transmitted to the cloud server, control the communication interface to output to the POS terminals a first instruction to set a communication destination of the transaction information to the cloud server, and when the transaction information is not to be transmitted to the cloud server, control the communication interface to output to the POS terminals a second instruction to set the communication destination of the transaction information to the store server, and upon receipt of the transaction information from the POS terminals, store the received transaction information in the storage device.

BRIEF DESCRIPTION OF THE DRAWINGS

FIG. 6 is a flowchart of a process performed by a control unit of the server.

DETAILED DESCRIPTION

Hereinafter, an embodiment will be described in detail with reference to the drawings. The present invention is not limited to the embodiment described below.

Figure 1:
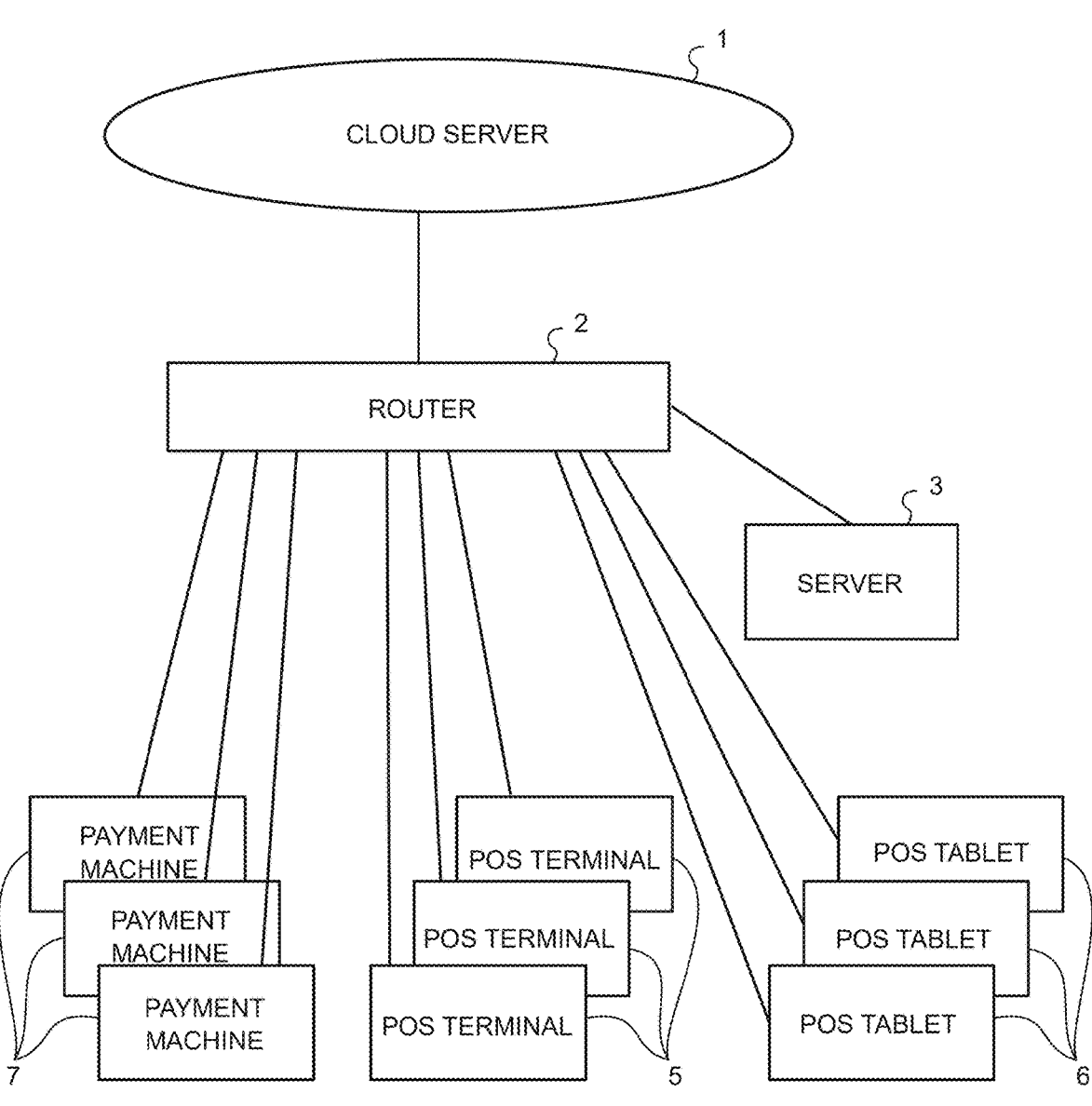
FIG. 1 is a diagram of a configuration of a system according to an embodiment.

FIG. 1 is a diagram illustrating an example of a configuration of a system according to the embodiment. The system includes a cloud server 1, a server 3, and various terminals (POS terminals 5, POS tablets 6, and payment machines 7). The cloud server 1, the server 3, and the various terminals are connected to each other via a router 2. The router 2, the server 3, the POS terminals 5, the POS tablets 6, and the payment machines 7 are installed in a store.

Each POS terminal 5 is a sales data processing apparatus mainly operated by a store clerk and executes item registration processes and payment processes for items according to operations performed by the store clerk. Each POS tablet 6 is a sales data processing apparatus mainly operated by a customer and executes item registration processes according to operations performed by the customer. Each payment machine 7 is a sales data processing apparatus mainly operated by a customer and executes payment processes for items registered by the POS tablet 6 or the POS terminal 5 according to operations performed by the customer.

Note that FIG. 1 shows an example in which multiple POS terminals 5, multiple POS tablets 6, and multiple payment machines 7 exist in each store. However, the present invention is not limited to this example. At least one POS terminal 5, one POS tablet 6, or one payment machine 7 may be provided in each store.

Each of the cloud server 1 and the server 3 is not necessarily implemented by a single apparatus. That is, each of the cloud server 1 and the server 3 may be implemented by multiple apparatuses.

The cloud server 1 centrally manages (or stores) information (including transaction information) related to all stores belonging to a group.

The router 2 connects apparatuses (the server 3, the POS terminals 5, the POS tablets 6, and the payment machines 7) in the store to the cloud server 1 to be able to transmit and receive information (or to communicate with each other). Communications between the apparatuses in the store and the cloud server 1 are performed, for example, via a Virtual Private Network (VPN) implemented by a public network such as the Internet.

The apparatuses (the servers 3, the POS terminals 5, the POS tablets 6, and the payment machines 7) in the store are connected to each other via a network, such as a Local Area Network (LAN), provided in the store and can transmit and receive information to and from each other (or communicate with each other).

The server 3 is an example of an information processing apparatus or a store server configured to be able to communicate with the cloud server 1 and the sales data processing apparatuses in the store.

The server 3 is installed in, for example, the back room of the store, stores information received (acquired) from the cloud server 1, provides the information to various terminals or sales data processing apparatuses (the POS terminals 5, the POS tablets 6, and the payment machines 7) in the store, and transmits information generated in the store to the cloud server 1.

Each of the POS terminals 5, the POS tablets 6, and the payment machines 7 is an example of a sales data processing apparatus. Each of the POS terminals 5, the POS tablets 6, and the payment machines 7 performs sales data processing using information received from the server 3 and transmits transaction information generated by the sales data processing to the server 3.

Figure 2:
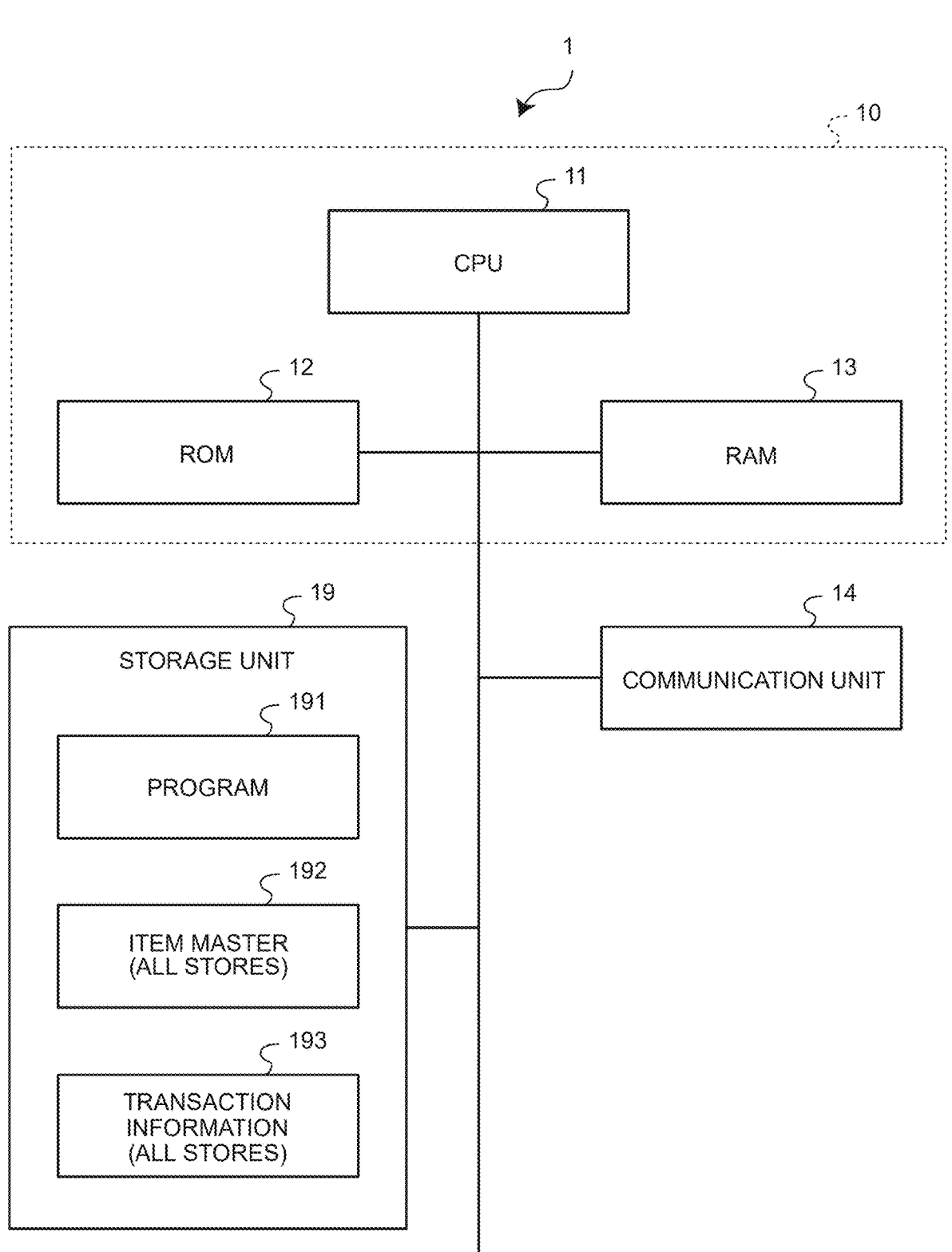
FIG. 2 is a block diagram of a configuration of a cloud server according to the embodiment.

FIG. 2 is a block diagram illustrating an example of a configuration of the cloud server 1. The cloud server 1 includes a Central Processing Unit (CPU) 11, a Read Only Memory (ROM) 12, a Random Access Memory (RAM) 13, a communication unit 14, and a storage unit 19.

The CPU 11 is an example of a processor and controls other components of the cloud server 1. The ROM 12 stores various programs. The RAM 13 is a workspace into which programs and various types of data are loaded. The CPU 11, the ROM 12, and the RAM 13 are connected to each other via a bus or the like and constitute a control unit 10 of the cloud server 1.

The communication unit 14 is a communication interface for connecting the control unit 10 to the apparatuses in the store (for example, the server 3 and the POS terminals 5) via a network for communication.

The storage unit 19 includes a storage medium, such as a Hard Disk Drive (HDD), a Solid State Drive (SSD), or a flash memory, and retains information even when the power supply is cut off. The storage unit 19 stores various programs and data, such as a program 191 that can be executed by the CPU 11 and an item master 192. Furthermore, the storage unit 19 stores transaction information 193 received from stores.

The item master 192 is an example of item information and contains information (item information) on items being sold by stores in, for example, a table format. The item master 192 includes, for example, the following fields.

Item code
  Item name
  Classification
  Unit price

The item code is an example of information (identification information) for identifying an item and is, for example, a JAN code. Other information items (the item name, the classification, and the unit price) are stored in association with the item code.

The "item name" field stores the name of an item. The "classification" field stores the classification (a section or a category), such as "fruits and vegetables", "daily foods", "processed foods", or "sundry goods", of an item. The "unit price" field stores the price of an item.

The transaction information 193 contains information on items purchased by customers in, for example, a table format. The transaction information 193 includes, for example, the following fields.

Transaction ID
  Date and time
  Store ID
  Terminal ID
  Store clerk ID
  Item information
  Total price The transaction ID is an example of information (identification information) for identifying a transaction. The date and time indicates the date and time when a recorded transaction is performed. The store ID, the terminal ID, and the store clerk ID are identification information of a store, a terminal (such as the POS terminal 5), and a clerk related to a recorded transaction.

Here, although one total price is provided for each combination of the transaction ID, the date and time, and the store ID, multiple sets of item information may be associated with the combination. The item information includes, for example, the following fields.

Item code
  Quantity
  Price

The total price indicates the amount of money for all items purchased in a recorded transaction. The item code is described above. The quantity indicates, for example, the number of pieces, the weight, or the volume of an item that is indicated by the item code and purchased in a recorded transaction. The price is a value obtained by multiplying the unit price by the quantity.

Note that the program 191, the item master 192, and the transaction information 193 do not need to be stored in the same storage unit 19.

Figure 3:
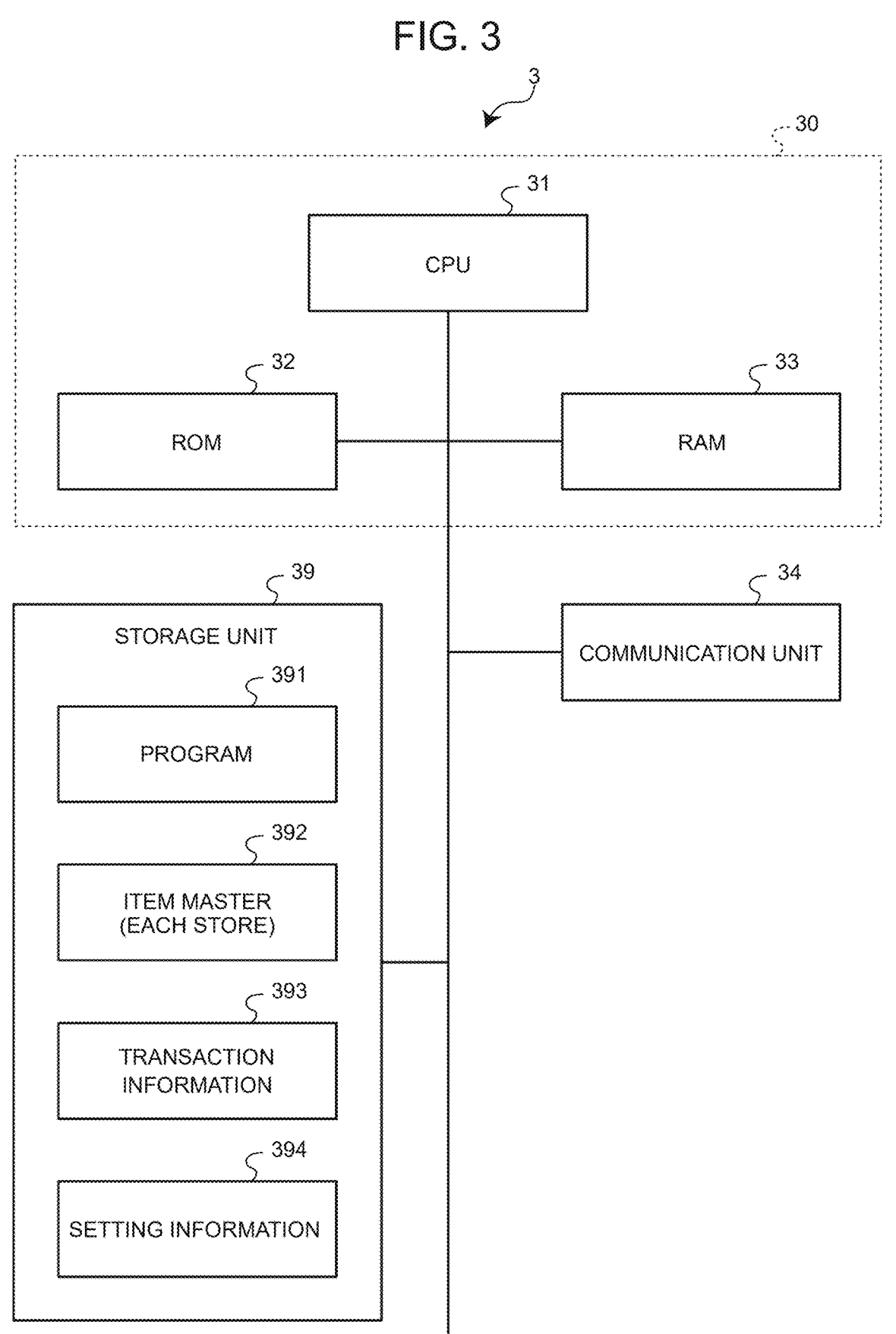
FIG. 3 is a block diagram of a configuration of a server according to the embodiment.

FIG. 3 is a block diagram illustrating an example of a configuration of the server 3. The servers 3 include a CPU 31, a ROM 32, a RAM 33, a communication unit 34, and a storage unit 39.

The CPU 31 is an example of a processor and controls other components of the servers 3. The ROM 32 stores various programs. The RAM 33 is a workspace into which programs and various types of data are loaded. The CPU 31, the ROM 32, and the RAM 33 are connected to each other via a bus or the like and constitute a control unit 30 of the server 3.

The communication unit 34 is a communication interface for connecting the control unit 30 (or the server 3) to external apparatuses (for example, the cloud server 1 and the POS terminal 5) via a network for communication.

The storage unit 39 includes a storage medium, such as an HDD, an SSD, or a flash memory, and retains information even when the power supply is cut off. The storage unit 39 stores a program 391 that can be executed by the CPU 31, an item master 392, transaction information 393, setting information 394, and the like. The storage unit 39 is an example of a storage device.

The storage unit 39 stores information (the item master 392) acquired from the item master 192 of the cloud server 1 so that the information can be referred to from each sales data processing apparatus in the store when the communication destination of the sales data processing apparatus is set to the storage unit 39.

The item master 392 includes fields that are the same as the fields of the item master 192 illustrated in FIG. 2. The item master 392 is generated by acquiring, from the item master 192 stored in the cloud server 1, pieces of item information related to the store (that is, records associated with the store ID of the store). The server 3 receives the item information related to the store from the cloud server 1 at a predetermined timing (for example, during a time period after the closing time and before the opening time) and updates the item master 392 based on the received item information.

The transaction information 393 includes fields that are the same as the fields of the transaction information 193. The server 3 receives the transaction information 193 newly generated in the store from the cloud server 1 at a predetermined timing (for example, at predetermined time intervals or during a time period in which the communication load is low). That is, the storage unit 39 accumulates (stores) at least transaction information related to the store among the transaction information 393 being managed (or accumulated) by the cloud server 1.

Furthermore, when item registration information 593 is received from the POS terminals 5, the POS tablets 6, and the payment machines 7 in the store, the server 3 transmits the item registration information 593 to the cloud server 1 at a predetermined timing (for example, at predetermined time intervals or during a time period in which the communication load is low).

The setting information 394 includes, for example, the following information items.

Store information
Terminal information
Store clerk information
Coupon information The store information includes, for example, a store ID and a store name associated with the store ID. The store name is the name of the store. The terminal information includes, for example, a terminal ID and a terminal type associated with the terminal ID. Examples of terminal types include a Personal Computer (PC), a tablet PC, and a smart phone. The store clerk information includes, for example, a store clerk ID and the name of a store clerk associated with the store clerk ID. The coupon information includes, for example, a coupon ID and a reward associated with the coupon ID.

Figure 4:
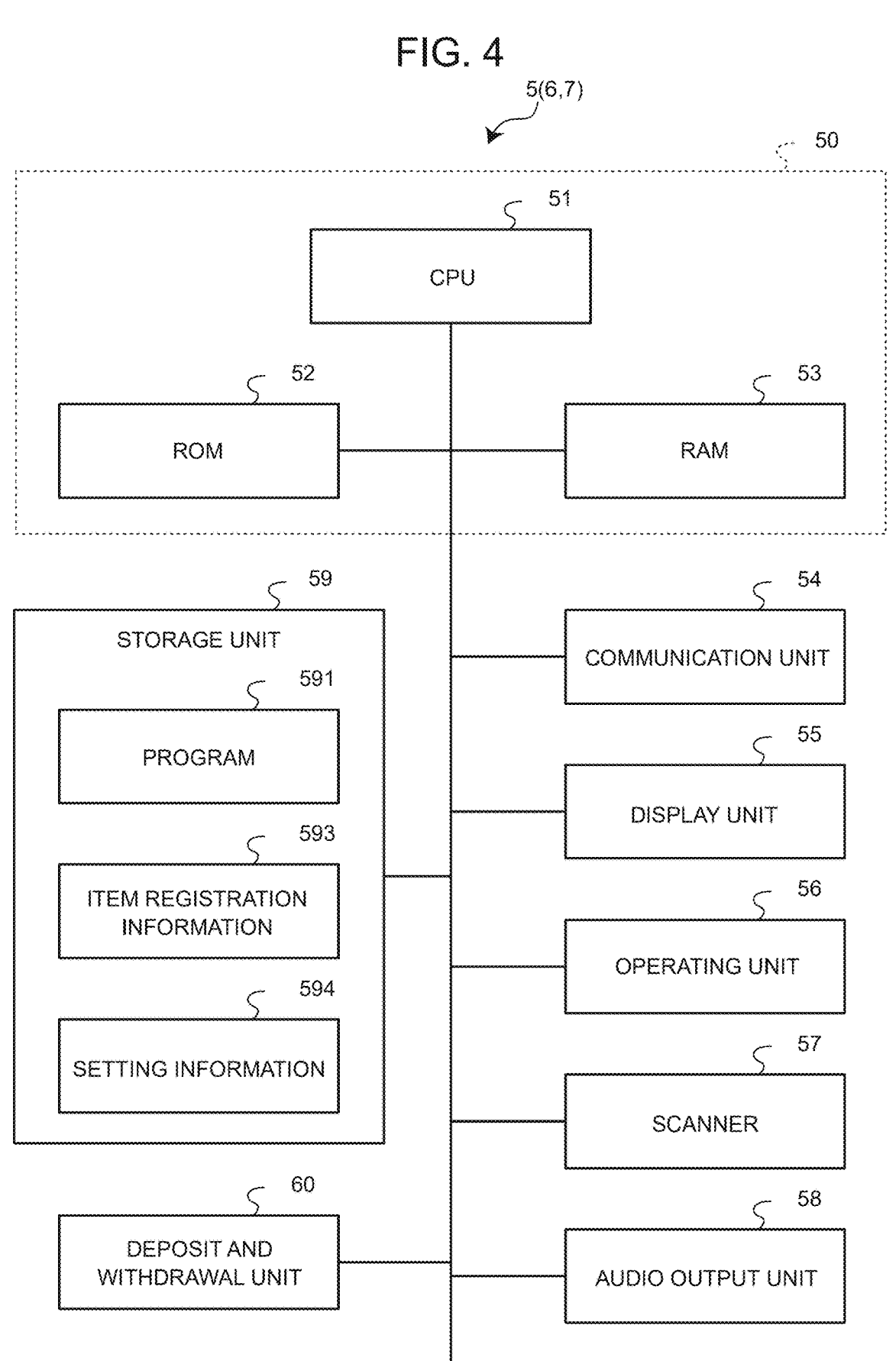
FIG. 4 is a block diagram of a configuration of a POS terminal according to the embodiment.

FIG. 4 is a block diagram illustrating an example of a configuration of the POS terminal 5. The POS terminal 5 includes a CPU 51, a ROM 52, a RAM 53, a communication unit 54, a display unit 55, an operating unit 56, a scanner 57, an audio output unit 58, a deposit and withdrawal unit 60, a storage unit 59, and the like.

The CPU 51 is an example of a processor and controls other components of the POS terminal 5. The ROM 52 stores various programs. The RAM 53 is a workspace into which programs and various types of data are loaded. The CPU 51, the ROM 52, and the RAM 53 are connected to each other via a bus or the like and constitute a control unit 50 of the POS terminal 5.

The communication unit 54 is a communication interface for connecting the control unit 50 to an external apparatus (for example, the cloud server 1 or the server 3) via a network for communication. In addition, the communication unit 54 mediates the input and output of data to and from USB peripheral devices.

The display unit 55 includes a display device, such as a Liquid Crystal Display (LCD), and displays various types of information under the control of the CPU 51.

The operating unit 56 includes an input device, such as a touch panel disposed on the surface of the display unit 55, a keyboard, or a pointing device, and outputs instructions input via the input device to the CPU 51.

The scanner 57 reads a code symbol (for example, a bar code or a two-dimensional code) provided on the surface of an item and outputs a decoded value. That is, when the code symbol is a code representing an item code, the scanner 57 outputs the item code.

The audio output unit 58 includes a speaker and a buzzer and outputs sound under the control of the CPU 51.

The deposit and withdrawal unit 60 is, for example, a change machine (or a cash drawer) that stores cash (coins and bills), accepts payment, and dispenses change.

The storage unit 59 includes a storage medium, such as an HDD, an SSD, or a flash memory, and retains information even when the power supply is cut off. The storage unit 59 stores a program 591 that can be executed by the CPU 51, item registration information 593, and setting information 594.

The program 591 is application software for causing the POS terminal 5 to function. Note that "POS" is an abbreviation for "Point of Sale" and means "point-of-sale information management." The POS terminal 5 performs point-of-sale information management.

The item registration information 593 contains information on items registered and to be purchased by a customer in, for example, a table format. The item registration information 593 includes fields that are substantially the same as the fields of the transaction information 193 and the transaction information 393. The POS terminal 5 transmits new transaction information to the cloud server 1 (or the server 3) each time a transaction is completed.

The item registration information 593 may be stored in the RAM 53 instead of the storage unit 59. The storage unit 59 or the RAM 53 stores the item registration information 593 related to items registered from the start to the completion of at least one transaction.

The setting information 594 is, for example, terminal information (a terminal ID and a terminal type) of the POS terminal 5 itself.

The POS tablet 6 has substantially the same configuration as the POS terminal 5 except that the deposit and withdrawal unit 60 is omitted. Also, the scanner 57 may be implemented as a functional unit that decodes a code symbol included in an image output by a camera provided in the POS tablet 6.

The payment machine 7 has substantially the same configuration as the POS terminal 5 described above. Note that the scanner 57 may be omitted from the payment machine 7.

Basically, each of the POS terminal 5, the POS tablet 6, and the payment machine 7 refers to the item master 192 stored in the cloud server 1 to register an item. Also, each of the POS terminal 5, the POS tablet 6, and the payment machine 7 basically transmits the item registration information 593 to the cloud server 1. As a result, the communication load rate of the cloud server 1 increases during a time period in which the store is crowded by many customers.

Therefore, in the present embodiment, when it is determined that the communication load rate of the cloud server 1 is excessively high, each of the POS terminal 5, the POS tablet 6, and the payment machine 7 switches the communication destination from the cloud server 1 to the server 3 (or the storage unit 39) in the store, refers to the item master 392 stored in the server 3 to register an item, and transmits the item registration information 593 to the server 3. The server 3 (the control unit 30 or the processor) outputs an instruction to switch the communication destination of the terminals (the POS terminals 5, the POS tablets 6, and the payment machines 7) via the communication unit 34 (or the communication interface).

Figure 5:
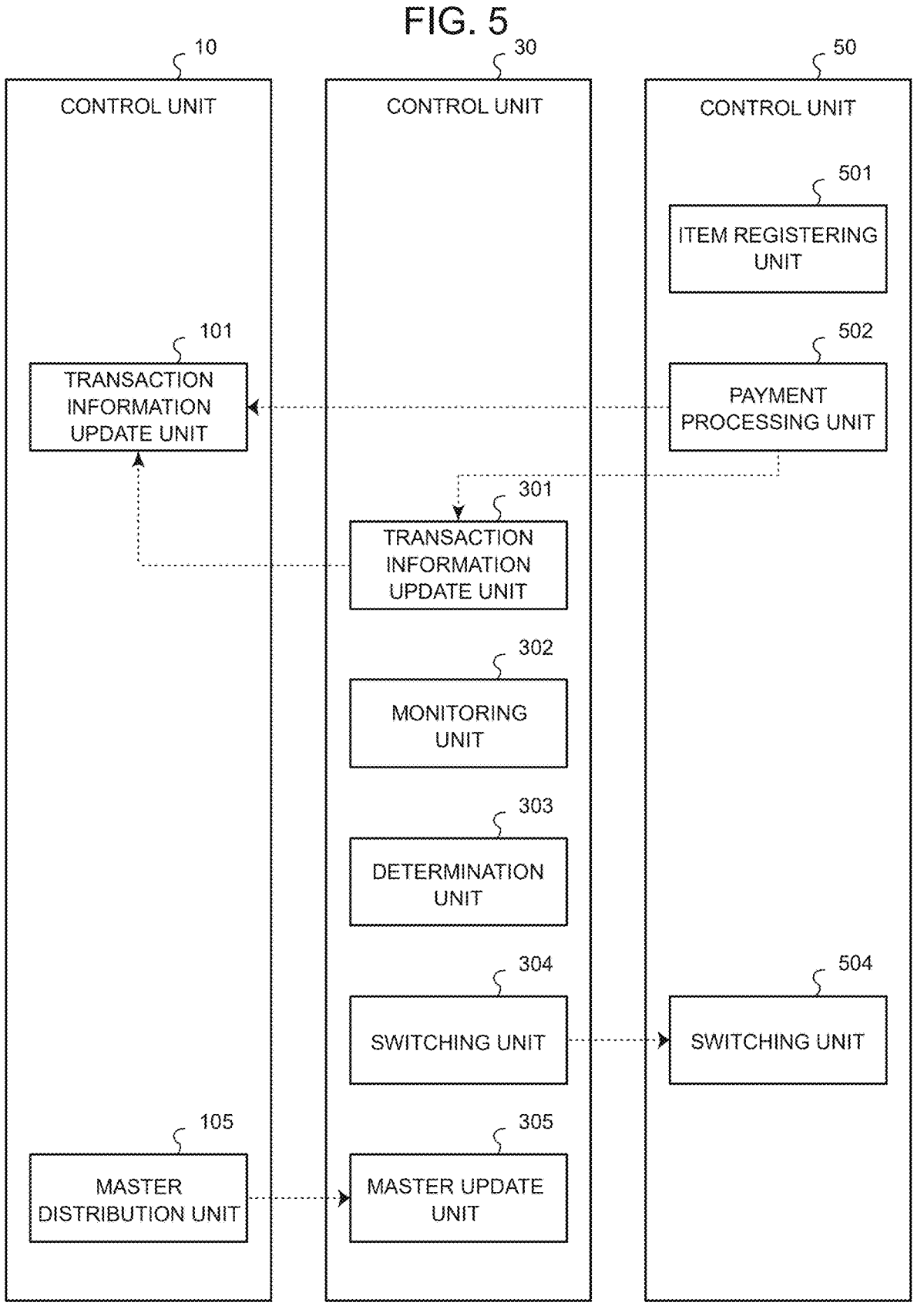
FIG. 5 is a block diagram illustrating various functional units included in control units and relationships among the functional units.

FIG. 5 is a block diagram illustrating an example of various functional units included in the control units 10, 30, and 50 and the relationships among the functional units. The control units 10, 30, and 50 implement various functional units illustrated in FIG. 5 by executing the programs 191, 391, and 591.

The control unit 10 of the cloud server 1 functions as a transaction information update unit 101 and a master distribution unit 105.

The control unit 30 of the server 3 in the store functions as a transaction information update unit 301, a monitoring unit 302, a determination unit 303, a switching unit 304, and a master update unit 305.

The control unit 50 of each of the POS terminal 5, the POS tablet 6, and the payment machine 7 functions as an item registering unit 501, a payment processing unit 502, and a switching unit 504.

The master distribution unit 105 distributes information in the item master 192 to the server 3 of each store, for example, during a time period after the closing time of the store and before the opening time of the store or when the store is not busy. Here, records of item information associated with the store ID of the store to which the server 3 belongs are distributed to the server 3.

The master update unit 305 receives the information (or item information) of the item master 192 distributed from the cloud server 1 and updates the item master 392 of the server 3 based on the received information.

The item registering unit 501 refers to a site that is set as an information acquisition source (or a communication destination) to acquire item information and performs item registration, that is, edits the item registration information 593. Since the information acquisition source is basically the cloud server 1, the item registering unit 501 refers to the item master 192.

The information acquisition source is basically the cloud server 1 that collects and manages (or accumulates) information from all stores in the group. When the communication load of the cloud server 1 is high, the server 3 functions as a proxy. To function as a proxy, the server 3 acquires, in advance, information related to the store among information accumulated by the cloud server 1 and stores (or accumulates and manages) the acquired information in the storage unit 39.

When the payment of the registered items is completed, the payment processing unit 502 transmits the item registration information 593 to a site set as an information storage unit (or a communication destination). Since the information storage unit is basically the cloud server 1, the payment processing unit 502 transmits the item registration information 593 to the cloud server 1. When the communication destination is switched to the server 3, the payment processing unit 502 transmits the item registration information 593 to the server 3.

The transaction information update unit 101 stores the item registration information 593 received from the sales data processing apparatuses of respective stores in the storage unit 19 as the transaction information 193.

The transaction information update unit 301 transmits information, which is accumulated in the storage unit 39 while the communication destination is set to the storage unit 39, to the cloud server 1 when the communication destination is set to the cloud server 1. In other words, when the communication destination is set to the cloud server 1, the control unit 30 (or the processor) of the server 3 controls the communication unit 34 (or the communication interface) to transmit, to the cloud server 1, information accumulated in the storage unit 39 (or the storage device) while the communication destination is set to the storage unit 39.

That is, when the item registration information 593 is received from the sales data processing apparatuses of the store, the transaction information update unit 301 keeps (or stores) the item registration information 593 as the transaction information 393 in the storage unit 39. When the cloud server 1 recovers from a high load state, the transaction information update unit 301 transmits the item registration information 593 of the store, which has been stored as the transaction information 393, to the cloud server 1.

The monitoring unit 302 monitors the communication load status of the cloud server 1.

The communication load status is represented by, for example, a communication load rate. The communication load rate is a value indicating the current status of the communication load when 100% indicates the maximum communication load that can be processed by the cloud server 1 and 0% indicates a state in which no communication is being performed. The cloud server 1 updates the current value of its communication load rate as needed. Furthermore, the cloud server 1 provides the communication load status (for example, a communication load rate) so that other communication-capable apparatuses can refer to the communication load status as needed.

The monitoring unit 302 periodically (for example, once every tens of seconds) acquires the communication load rate updated and provided by the cloud server 1. In other words, the control unit 30 (or the processor) of the server 3 monitors the communication load rate of the cloud server 1 via the communication unit 34 (or the communication interface).

When the cloud server 1 communicates with terminals of multiple stores, even when the amount of communication performed by the terminals of a certain store with the cloud server 1 is small, the amount of communication performed by the terminals of another store with the cloud server 1 may be large. That is, the communication load rate of the cloud server 1 is not directly proportional to the amount of communication performed by the terminals of each store.

The determination unit 303 determines whether it is necessary to switch the communication destination of the terminals in the store based on the communication load status of the cloud server 1 output by the monitoring unit 302. This determination is performed using, for example, the communication load rate of the cloud server 1 acquired by the monitoring unit 302 and threshold values.

When the communication load rate is lower than a first threshold value (for example, 30%), the determination unit 303 determines that the communication load of the cloud server 1 is low and the cloud server 1 can be used as the communication destination.

When the communication load rate exceeds a second threshold value (for example, 70%), the determination unit 303 determines that the cloud server 1 cannot be used as the communication destination because the communication load of the cloud server 1 is high. In this case, the server 3 is used as the communication destination in place of the cloud server 1.

Furthermore, when the communication load rate is between the first threshold value and the second threshold value, the determination unit 303 determines to switch the communication destination of, for example, about one half of the sales data processing apparatuses in the store.

The determination unit 303 also performs determination in an opposite way. That is, when the communication load rate of the cloud server 1 decreases from a high value to a low value, the determination unit 303 switches the communication destination from the server 3 to the cloud server 1. Also in this case, the communication load rate and the first and second threshold values described above are used for the determination.

The switching unit 304 receives the determination result from the determination unit 303 and transmits an instruction to switch the communication destination to some or all of the terminals (the POS terminals 5, the POS tablets 6, and the payment machines 7) in the store.

For example, when the determination unit 303 determines that the communication load of the cloud server 1 is high based on the output of the monitoring unit 302, the switching unit 304 outputs an instruction to switch the communication destination of the sales data processing apparatuses to the storage unit 39.

Also, for example, when the determination unit 303 determines that the cloud server 1 can be used as the communication destination without any problem, that is, the communication load of the cloud server 1 is low, based on the output of the monitoring unit 302, the switching unit 304 outputs an instruction to switch the communication destination back to the cloud server 1.

Each terminal receiving the instruction from the switching unit 304 switches the communication destination in accordance with the received instruction. That is, when the instruction from the switching unit 304 is for switching the communication destination from the cloud server 1 to the server 3, the terminal receiving the instruction switches the communication destination to the server 3. On the other hand, when the instruction from the switching unit 304 is for switching the communication destination from the server 3 to the cloud server 1, the terminal receiving the instruction switches the communication destination to the cloud server 1. Thus, the control unit 30 (or the processor) of the server 3 is configured to output, via the communication unit 34 (or the communication interface), an instruction to switch the communication destination between the cloud server 1 and the server 3 (or the storage unit 39) according to the communication load rate of the cloud server 1.

The percentage of the sales data processing apparatuses whose communication destination is switched to (or set to) the cloud server 1 or the storage unit 39 can be changed in accordance with the communication load rate of the cloud server 1. For example, as the communication load rate increases, the communication destination of a greater number of sales data processing apparatuses in the store is set to the storage unit 39. On the other hand, as the communication load decreases, the communication destination of a greater number of sales data processing apparatuses in the store is switched back to the cloud server 1.

Figure 6:
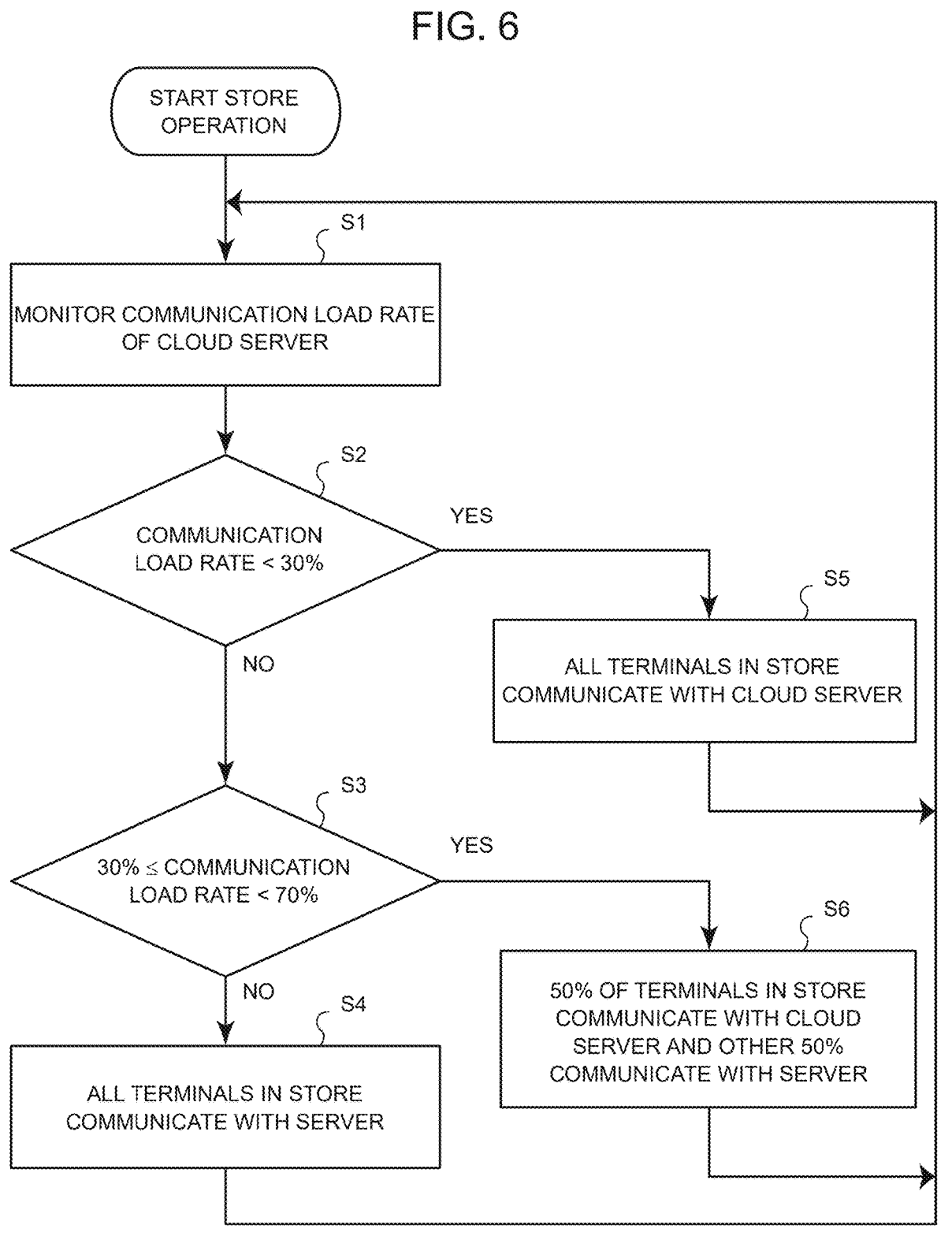

FIG. 6 is a flowchart of a process performed by the control unit 30 of the server 3. Here, each step in FIG. 6 is performed by the control unit 30 (or the processor) of the server 3 by controlling other components of the server 3.

First, the monitoring unit 302 of the control unit 30 monitors the communication load rate of the cloud server 1 (step S1). Next, the determination unit 303 of the control unit 30 determines whether the communication load rate is less than 30% (step S2).

When the communication load rate is greater than or equal to 30% (No at step S2), the determination unit 303 of the control unit 30 determines, whether the communication load rate is greater than or equal to 30% and less than 70% (step S3).

When the communication load rate is greater than or equal to 70% (No at step S3), the control unit 30 causes all terminals in the store to communicate with the servers 3 (step S4). In this case, the switching unit 304 of the control unit 30 switches the communication destination of terminals in the store, whose communication destination has been set to the cloud server 1, to the server 3. That is, the communication destination of all terminals is set to the server 3 (or the storage unit 39).

At step S2, when the communication load rate is less than 30% (Yes at step S2), the control unit 30 causes all terminals in the store to communicate with the cloud server 1 (step S5). In this case, the switching unit 304 of the control unit 30 switches the communication destination of terminals in the store, whose communication destination has been set to the server 3, to the cloud server 1. That is, the communication destination of all terminals is set to the cloud server 1.

At step S3, when the communication load rate is greater than or equal to 30% and less than 70% (Yes at step S3), the control unit 30 causes 50% of the terminals in the store to communicate with the cloud server 1 and causes the other 50% of the terminals to communicate with the server 3 (step S6). In this case, the switching unit 304 of the control unit 30 switches the communication destination of the terminals in the store as appropriate. That is, the communication destination of one half of the terminals in the store is set to the cloud server 1, and the communication destination of the other half of the terminals in the store is set to the server 3 (or the storage unit 39).

As described above, according to the present embodiment, since the server 3 performs the process of instructing the sales data processing apparatuses in the store to appropriately switch their communication destinations, the sales data processing apparatuses (or the terminals) in the store can be used without any problem even when the communication load of the cloud server 1 is high.

It should be noted that the above-described embodiment can be modified as appropriate by changing a part of the configurations or functions of the above-described apparatuses.

Programs to be executed by each of the apparatuses of the above-described embodiment may be provided in a ROM or the like in advance. Programs to be executed by each of the apparatuses of the above-described embodiment may be provided in a computer-readable recording medium, such as a CD-ROM, a flexible disk (FD), a CD-R, or a Digital Versatile Disk (DVD), in an installable format or an executable format.

Also, programs to be executed by each of the apparatuses of the above-described embodiment may be stored in a computer connected to a network, such as the Internet, and may be downloaded via the network. Furthermore, programs to be executed by each of the apparatuses of the above-described embodiment may be provided or distributed via a network, such as the Internet.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A store server for managing point-of-sale (POS) terminals installed in a store, the store server comprising:
   a communication interface connectable to the POS terminals through a local network in the store and connectable to a cloud server installed outside the store through a public network, the cloud server being configured to manage:
      a plurality of pieces of transaction information each generated by one of the POS terminals for one or more items purchased in a sales transaction, and
      an item master database storing a plurality of pieces of item information about items sold in the store;
   a storage device that stores a copy of the item master database; and a processor configured to:

obtain a communication load of the cloud server from the cloud server through the public network, wherein the communication load is a value indicating a current status of communication processing relative to a maximum communication load that can be processed by the cloud server, when the obtained communication load is lower than a first threshold, control the communication interface to output, to the POS terminals through the local network, a first instruction that causes the POS terminals to set a communication destination of a request for item information about an item to be registered in a subsequent sales transaction and subsequent transaction information corresponding to the subsequent sales transaction, to the cloud server, and when the obtained communication load is higher than or equal to a second threshold that is higher than the first threshold, control the communication interface to output, to the POS terminals through the local network, a second instruction that causes the POS terminals to set the communication destination of the request and the subsequent transaction information to the store server, upon receipt of the subsequent transaction information from the POS terminals, store the received transaction information in the storage device, upon receipt of the request from the POS terminals, control the communication interface to transmit the item information stored in the copy of the item master database to the POS terminals through the local network, wherein the processor is further configured to, after the second instruction is output:

obtain another communication load of the cloud server from the cloud server through the public network, and in response to determining that said another communication load becomes lower than the first threshold, control the communication interface to transmit, to the cloud server through the public network, the transaction information received from the POS terminals and stored in the storage device.

2. The store server according to claim 1, wherein the processor is configured to, when the communication load is higher than or equal to the first threshold and lower than the second threshold, control the communication interface to output a third instruction to a certain percentage of the POS terminals, the third instruction causing the certain percentage of the POS terminals to set the communication destination of the request and the subsequent transaction information to the store server.

3. The store server according to claim 2, wherein the third instruction is output to half of the POS terminals.

4. The store server according to claim 2, wherein the certain percentage varies depending on the communication load.

5. The store server according to claim 1, wherein the processor is configured to acquire, from the cloud server, information for updating the copy of the item master database stored in the storage device.

6. The store server according to claim 1, wherein the store server is connected via the local network to a payment machine installed in the store and configured to execute a payment process for items registered by one of the POS terminals, and the processor is configured to control the communication interface to output the first instruction or the second instruction to the payment machine to set a communication destination of transaction information generated by the payment machine.

7. The store server according to claim 1, wherein the communication interface is connected to the POS terminals via a local area network (LAN) provided in the store, and is connected to the cloud server via a router and a virtual private network (VPN).

8. A method performed by a store server for managing point-of-sale (POS) terminals installed in a store, the method comprising:

storing in a storage device a copy of an item master database that stores a plurality of pieces of item information about items sold in the store;

obtaining, through a public network, a communication load of a cloud server that is installed outside the store and configured to manage the item master database and a plurality of pieces of transaction information each generated by one of the POS terminals for one or more items purchased in a sales transaction;

when the obtained communication load is lower than a first threshold, outputting, to the POS terminals through a local network in the store, a first instruction that causes the POS terminals to set a communication destination of a request for item information about an item to be registered in a subsequent sales transaction and subsequent transaction information corresponding to the subsequent sales transaction, to the cloud server; and when the obtained communication load is higher than or equal to a second threshold that is higher than the first threshold, outputting, to the POS terminals through the local network, a second instruction that causes the POS terminals to set the communication destination of the request and the subsequent transaction information to the store server, receiving the subsequent transaction information from the POS terminals, and storing the received transaction information in the storage device, receiving the request from the POS terminals, and transmitting the item information stored in the copy of the item master database to the POS terminals through the local network, obtaining another communication load of the cloud server from the cloud server through the public network, and determining that said another communication load becomes lower than the first threshold, and transmitting, to the cloud server through the public network, the transaction information received from the POS terminals and stored in the storage device.

9. The method according to claim 8, further comprising:

when the communication load is higher than or equal to the first threshold and lower than the second threshold, outputting a third instruction to a certain percentage of the POS terminals, the third instruction causing the certain percentage of the POS terminals to set the communication destination of the request and the subsequent transaction information to the store server.

10. The method according to claim 9, wherein the third instruction is output to half of the POS terminals.

11. The method according to claim 9, wherein the certain percentage varies depending on the communication load.

12. The method according to claim 8, further comprising:

acquiring, from the cloud server, information for updating the copy of the item master database stored in the storage device.

13. The method according to claim 8, wherein the store server is connected via the local network to a payment machine installed in the store and configured to execute a payment process for items registered by one of the POS terminals, and the method further comprises: outputting the first instruction or the second instruction to the payment machine to set a communication destination of transaction information generated by the payment machine.

14. The method according to claim 8, wherein the communication interface is connected to the POS terminals via a local area network (LAN) provided in the store, and is connected to the cloud server via a router and a virtual private network (VPN).

15. A non-transitory computer-readable storage medium storing a program for causing a store server for managing point-of-sale (POS) terminals installed in a store, to execute a method comprising:

storing in a storage device a copy of an item master database that stores a plurality of pieces of item information about items sold in the store;

obtaining, through a public network, a communication load of a cloud server that is installed outside the store and configured to manage the item master database and a plurality of pieces of transaction information each generated by one of the POS terminals for one or more items purchased in a sales transaction;

when the obtained communication load is lower than a first threshold, outputting, to the POS terminals through a local network in the store, a first instruction that causes the POS terminals to set a communication destination of a request for item information about an item to be registered in a subsequent sales transaction and subsequent transaction information corresponding to the subsequent sales transaction, to the cloud server; and when the obtained communication load is higher than or equal to a second threshold that is higher than the first threshold, outputting, to the POS terminals through the local network, a second instruction that causes the POS terminals to set the communication destination of the request and the subsequent transaction information to the store server, receiving the subsequent transaction information from the POS terminals, and storing the received transaction information in the storage device, receiving the request from the POS terminals, and transmitting the item information stored in the copy of the item master database to the POS terminals through the local network, obtaining another communication load of the cloud server from the cloud server through the public network, and determining that said another communication load becomes lower than the first threshold, and transmitting, to the cloud server through the public network, the transaction information received from the POS terminals and stored in the storage device.

\*　\*　\*　\*　\*